United States Patent
Mori

(10) Patent No.: US 8,794,283 B2
(45) Date of Patent: Aug. 5, 2014

(54) RUN-FLAT TIRE

(75) Inventor: Hiroyuki Mori, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 96 days.

(21) Appl. No.: 13/500,205

(22) PCT Filed: Oct. 5, 2010

(86) PCT No.: PCT/JP2010/067421
§ 371 (c)(1),
(2), (4) Date: Apr. 4, 2012

(87) PCT Pub. No.: WO2011/043319
PCT Pub. Date: Apr. 14, 2011

(65) Prior Publication Data
US 2012/0193007 A1  Aug. 2, 2012

(30) Foreign Application Priority Data
Oct. 5, 2009  (JP) ................. 2009-231164

(51) Int. Cl.
*B60C 17/00*  (2006.01)
*B60C 13/00*  (2006.01)
*B60C 9/08*  (2006.01)
*B60C 9/00*  (2006.01)

(52) U.S. Cl.
CPC ......... *B60C 17/0036* (2013.01); *B60C 17/0009* (2013.01); *B60C 9/0042* (2013.01); *B60C 9/005* (2013.01); *B60C 9/08* (2013.01); *B60C 13/00* (2013.01); *B60C 2009/0035* (2013.01); *B60C 2009/0071* (2013.01); *B60C 2009/0416* (2013.01)

USPC ........... 152/517; 152/451; 152/551; 152/555; 152/556; 152/557

(58) Field of Classification Search
USPC .......................... 152/517, 451, 555–557, 551
See application file for complete search history.

(56) References Cited

U.S. PATENT DOCUMENTS 5,067,538 A * 11/1991 Nelson et al. ................. 152/451
5,350,632 A *  9/1994 Lang ........................ 152/451 X (Continued)

FOREIGN PATENT DOCUMENTS

JP  S63-159543 A  7/1988
JP  2000-198307 A  7/2000

(Continued)

OTHER PUBLICATIONS

English machine translation of JP 2010-137601 A, Jun. 24, 2010.*

(Continued)

*Primary Examiner* — Adrienne C Johnstone
(74) *Attorney, Agent, or Firm* — Sughrue Mion, PLLC

(57) ABSTRACT

A run-flat tire is provided with a reinforcing cord layer adjoining the radial carcass at least from the belt end to the maximum width portion of the tire side portion; the cord constituting the reinforcing cord layer is nylon 66 cord, cellulose fiber cord, PET cord, PEN cord or aramid/nylon 66 hybrid cord, and has a cord angle of less than 10° with respect to the tire radius direction; and the elastic modulus of the cord pulled out from the tire at a temperature of 25° C. under the conditions of a load of 3 N is not higher than 40 cN/dtex, and the thermal shrinkage stress σ (cN/dtex) at a temperature of 177° C. and the elastic modulus E (cN/dtex) at a temperature of 177° C. under the conditions of a load of 10 N satisfy the following conditions: $\sigma + 0.025E \geq 0.36$, $40 \geq E \geq 8$, and $\sigma \geq 0.05$.

5 Claims, 2 Drawing Sheets

(56) References Cited

U.S. PATENT DOCUMENTS

| | | | |
|---|---|---|---|
| 5,658,665 A * | 8/1997 | Kim et al. | 152/451 X |
| 2009/0090447 A1 * | 4/2009 | Baldwin et al. | 152/451 |
| 2009/0320984 A1 | 12/2009 | Maehara | |

FOREIGN PATENT DOCUMENTS

| | | |
|---|---|---|
| JP | 2004-306658 A | 11/2004 |
| JP | 2005-161964 A | 6/2005 |
| JP | 2005-193865 A | 7/2005 |
| JP | 2006-076374 A | 3/2006 |
| JP | 2007-106398 A | 4/2007 |
| JP | 2007-191154 A | 8/2007 |
| JP | 2008-007022 A | 1/2008 |
| JP | 2008-024093 A | 2/2008 |
| JP | 2008-174166 A | 7/2008 |
| JP | 2008-296634 A | 12/2008 |
| JP | 2009-067322 A | 4/2009 |
| JP | 2010137601 A * | 6/2010 |
| WO | WO-2008/156333 A1 * | 12/2008 |

OTHER PUBLICATIONS

Office Action dated Dec. 24, 2013 from the State Intellectual Property Office of P. R. China in a Chinese Application No. 201080044859.2.

Japanese Office Action issued on May 13, 2014 from the Japanese Patent Office in Japanese Application No. 2011-535395.

* cited by examiner

RUN-FLAT TIRE

TECHNICAL FIELD

The present invention relates to a run-flat tire (hereinafter, also simply referred to as "tire"), and particularly to an improvement of a reinforcing cord layer in a side reinforcing type run-flat tire.

BACKGROUND ART

Conventionally, as a so-called run-flat tire which can travel a certain amount of distance safely without losing a load supporting ability of the tire even in the state in which the inner pressure of the tire is decreased due to a puncture or the like, a variety of run-flat tires of a side reinforced type have been proposed wherein a crescent cross-sectional side reinforcing rubber layer having a relatively high modulus is disposed in the inner side of a carcass in the sidewall portion, thereby improving the rigidity of the sidewall portion, and allowing the tire to support loads without extremely increasing the flexural deformation of the sidewall portion when the inner pressure is decreased.

However, in a conventional side reinforcing type run-flat tire, since deformation of the tire is large during run-flat running and the temperature of a sidewall portion becomes high, and the stiffness of the sidewall portion decreases due to softening of the rubber, causing a further increase in the deformation, the main reason for failure at the end of run-flat running has been due to a crack in the above-mentioned crescent cross-sectional side reinforcing rubber layer. For this reason, the conventional side reinforcing type run-flat tire has a problem in that the durable distance during run-flat running is short.

On the other hand, when the sidewall portion is reinforced by making the gauge of the side reinforcing rubber layer thick or the like in order to prolong the durable distance of the tire during run-flat running, there has been a problem in that the tire weight increases, the vertical stiffness of the tire during normal running increases, thereby deteriorating the ride quality during normal running.

As technologies for attaining the combination of the run-flat durability and ride quality for a run-flat tire, for example, in Patent Document 1, disclosed is a run-flat tire in which the inclination angle of a cord with respect to the tire radius direction is 0 to 20°, and a reinforcing cord layer having a stiffness equivalent to or morethan that of a carcass is provided such that the layer is at least adjacent to a carcass portion from the belt end to the maximum width portion of the tire side portion and such that the layer covers the reinforcing rubber layer from the outer side of the carcass. In Patent Documents 2 and 3, technologies are disclosed in which, in a side reinforcing type run-flat tire, a polyketone fiber cord which is composed of a plurality of twisted filament bundles formed of polyketone and in which the thermal shrinkage stress σ at a temperature of 177° C. and the elastic modulus E at a temperature of 25° C. under the conditions of a load of 49N satisfy prescribed conditions is used for a cord reinforcing layer which is arrangedon at least a part of a region A from the belt end to the maximum width portion and a region B from the vicinity of a bead core to a bead filler.

RELATED ART DOCUMENTS

Patent Documents

Patent Document 1: Japanese Unexamined Patent Application Publication No. 2007-106398 (claims and the like)
Patent Document 2: Japanese Unexamined Patent Application Publication No. 2007-191154 (claims and the like)
Patent Document 3: Japanese Unexamined Patent Application Publication No. 2008-024093 (claims and the like)

SUMMARY OF THE INVENTION

Problems to be Solved by the Invention

By the technologies according to the above-mentioned Patent Documents 1 to 3, a run-flat tire in which the ride quality and the run-flat durability during normal running are favorably combined can be attained. However, along with the recent improved required performance, a technology in which both of these performances can be more highly combined has been desired.

Accordingly, an object of the present invention is to overcome the above-mentioned problems and to provide a run-flat tire in which the ride quality and the run-flat durability during normal running are highly combined.

Means for Solving the Problems

The present inventor intensively studied to find that the above-mentioned problems can be solved by using, as a cord for a reinforcing cord layer to be inserted into a specific region, those which satisfy the requirements of specific material and physical properties, to thereby complete the present invention.

That is, the run-flat tire of the present invention is a run-flat tire comprising a radial carcass composed of one or more carcass plies extending toroidally between bead cores embedded in a pair of bead portions, at least one layer of belt arranged at the outer part of the radial carcass in the tire radius direction, and provided with a tread portion arranged at an outer part of a crown portion of the radial carcass in the tire radius direction, a pair of buttress portions positioned at both ends of the tread portion and a pair of side portions connecting the buttress portion and the bead portion, wherein a pair of crescent cross-sectional side reinforcing rubber layers are arranged at the inner part of the radial carcass extending from the buttress portion to the side portion, characterized in that the tire is provided with a reinforcing cord layer adjoining the radial carcass at least from the belt end to the maximum width portion of the tire side portion;

cords constituting the reinforcing cord layer are selected from the group consisting of nylon 66 cord, cellulosic fiber cord, polyethylene terephthalate cord, polyethylene naphthalate cord and aramid/nylon 66 hybrid cord, and has a cord angle of less than 10° with respect to the tire radius direction; and the elastic modulus of the cord pulled out from the tire at a temperature of 25° C. under the conditions of a load of 3N is not higher than 40 cN/dtex, and the thermal shrinkage stress σ(cN/dtex) at a temperature of 177° C. and the elastic modulus E(cN/dtex) at a temperature of 177° C. under the conditions of a load of 10N satisfy the following conditions: σ+0.025E≥0.36, 40≥E≥8, and σ≥0.05.

Here, the elastic modulus of the above-mentioned cord at a temperature of 25° C. under the conditions of a load of 3N is an elastic modulus in the unit of cN/dtex which is calculated from the tangent at 3 N on the SS curve by a cord tension test according to JIS. The thermal shrinkage stress σ of the above-mentioned cord at a temperature of 177° C. is a stress generated when a sample of a pre-vulcanized cord having a fixed length of 25 cm to which a general dip treatment is applied is heated at a rate of temperature rise of 5° C./min. until 177° C.

Further, the elastic modulus E at a temperature of 177° C. under the conditions of a load of 10 N is an elastic modulus in the unit of cN/dtex which is calculated from the tangent at 10 N on the SS curve obtained by a cord tension test according to JIS performed in a thermostat bath setting the temperature to 177° C.

In the present invention, the thermal shrinkage stress σ (cN/dtex) at a temperature of 177° C. and the elastic modulus E(cN/dtex) at a temperature of 177° C. under the conditions of a load of 10N of the cord pulled out from a tire preferably satisfy the following conditions: σ+0.025E≥0.36, 40≥E≥8 and σ≥0.15. Further, the end count of the cords constituting the reinforcing cord layer is favorably 40 to 60 per 50 mm.

Further, in the present invention, the cord constituting the carcass ply is preferably selected from the group consisting of cellulosic fiber cord, polyethylene terephthalate cord and polyethylene naphthalate cord, and the reinforcing cord layer is preferably rolled up from the belt end to the outer part of the bead core to be inserted.

Effect of the Invention

In the present invention, by employing the above-mentioned constitution, a run-flat tire in which the ride quality and the run-flat durability during normal running are more highly combined than in the conventional tire can be attained.

MODES FOR CARRYING OUT THE INVENTION

Preferred embodiments of the present invention will now be described in detail with reference to the drawings.

Figure 1:
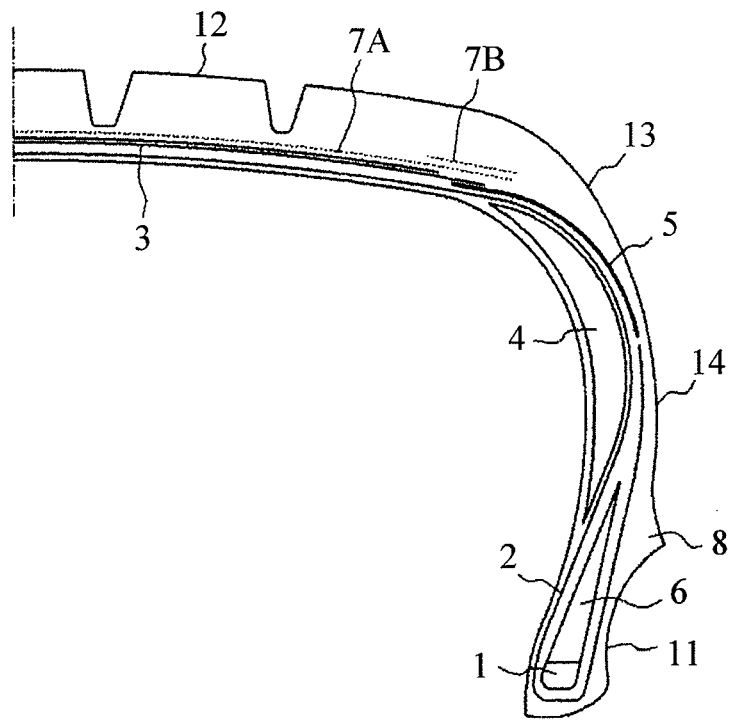
FIG. 1 is a half sectional view in the width direction illustrating one example of a run-flat tire of the present invention.

FIG. 1 represents a half sectional view in the width direction illustrating one example of a run-flat tire of the present invention. The illustrated run-flat tire comprises a radial carcass 2 composed of one or more carcass plies composed of a body portion extending toroidally between bead cores 1 embedded in a pair of bead portions 11 and a rolled-up portion which is rolled up around the bead core 1 from the inner part to the outer part in the tire width direction as a skeleton, and is provided with a tread portion 12 arranged at an outer part of a crown portion of the radial carcass 2 in the tire radius direction, a pair of buttress portions 13 positioned at both ends thereof and a pair of side portions 14 connecting the buttress portion 13 and the bead portion 11, wherein a pair of crescent cross-sectional side reinforcing rubber layers 4 are arranged at the inner part of the radial carcass 2 extending from the buttress portion 13 to the side portion 14.

In the illustrated tire, a bead filler 6 is arranged between the body portion of the radial carcass 2 and a turn-over portion and at the outer part of the bead core 1 in the tire radius direction; and belt 3 composed of two belt layers, belt reinforcing layer 7A covering all of the belt 3 and a pair of belt reinforcing layers 7B covering only both ends of the belt reinforcing layer 7A are arranged in the mentioned order. Here, the belt layer is generally composed of a rubberized cord layer extending obliquely with respect to the tire equatorial plane, preferably a rubberized steel cord layer; and the two belt layers are piled such that the cords which constitute the belt layer intersect across the tire equatorial plane to constitute the belt layer 3. The belt reinforcing layers 7A and 7B are generally composed of a rubberized cord layer whose cords are arranged substantially parallel to the tire circumference direction.

The radial carcass 2 of the illustrated tire is composed of one carcass ply. However, in the present invention, the number of carcass plies which constitute the radial carcass 2 is not limited thereto, and may be two or more. The structure thereof is also not particularly limited thereto. The engaging structure of the radial carcass 2 in the bead portion is also not limited to a structure which is rolled up around the bead core to be engaged as shown in the figure, and may be a structure in which the end of the radial carcass is sandwiched by two layers of bead cores (not shown in the figure). In the present invention, as a cord constituting the carcass ply 2, any of those selected from the group consisting of cellulosic fiber cord, polyethylene terephthalate (PET) cord and polyethylene naphthalate (PEN) cord can be favorably used.

The illustrated belt 3 is composed of two belt layers. However, in the present invention, the number of the belt layers constituting the belt 3 is not limited thereto. Further, the illustrated belt reinforcing layers 7A, 7B are composed of one layer of belt reinforcing layer 7A covering all of the belt 3 and a pair of belt reinforcing layers 7B covering only both of the end portions of the belt reinforcing layer 7A to form a so-called cap-layer structure. In the present invention, it is not necessary to arrange belt reinforcing layers 7A, 7B, and a belt reinforcing layer having another structure and another number of layers can also be arranged.

The illustrated tire comprises a substantially triangular cross-sectional rim guard 8 at the outer part, in the tire width direction, of a turn-over portion of the radial carcass 2 in the area extending between the side portion 13 and the bead portion 11. However, in the present invention, it is also not necessary to arrange the rim guard 8, and a rim guard having another shape can be arranged. In the present invention, the "maximum width portion" in the tire side portion refers to a maximum width portion of the tire side portion without the rim guard 8.

Figure 2:
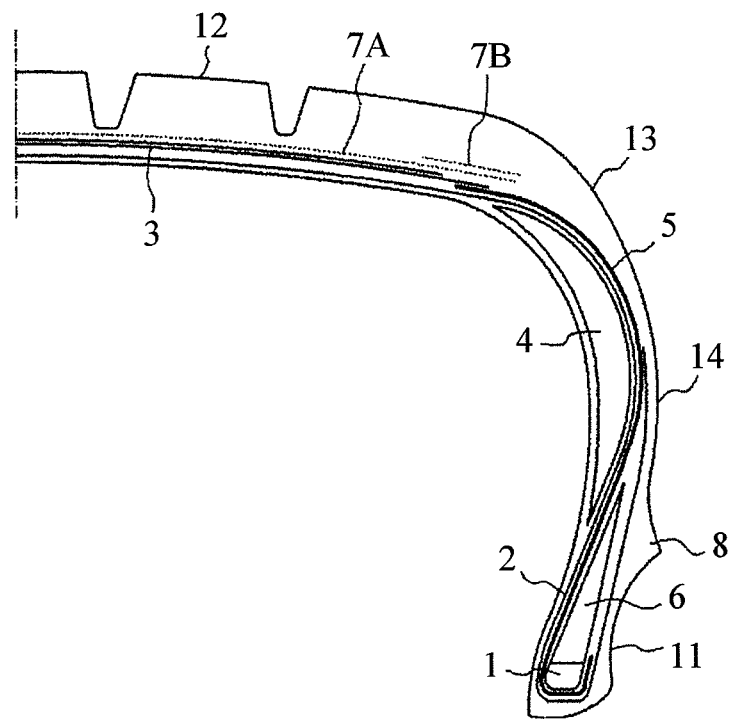
FIG. 2 is a half sectional view in the width direction illustrating another example of a run-flat tire of the present invention.
Figure 3:
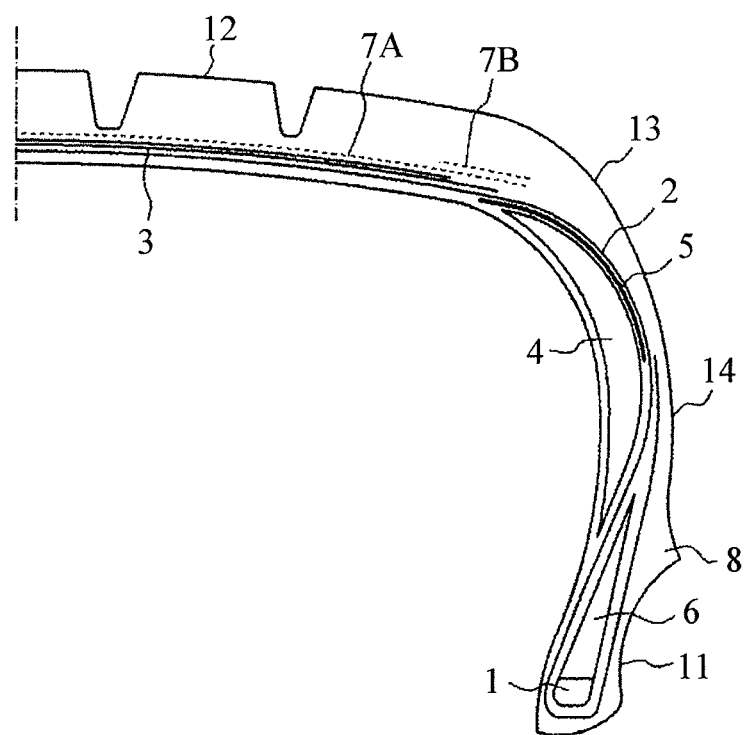
FIG. 3 is a half sectional view in the width direction illustrating still another example of a run-flat tire of the present invention.

In the present invention, a reinforcing cord layer 5 which adjoins the radial carcass 2, in the example illustrated in FIG. 1, from the end of the belt 3 to the maximum width portion of the tire side portion is arranged at the outer part of the tire radius direction. Such a reinforcing cord layer 5 may be those adjoining at least a portion from the end of the belt 3 to the maximum width portion of the tire side portion as a portion where the tensile stress on the carcass ply during run-flat running is high, whereby the run-flat durability can be effectively improved without increasing the tire weight. As shown in FIG. 2, the reinforcing cord layer 5 extends to the bead core 1 and has a rolled-up portion which is rolled up around the bead core 1 from the inner part to the outer part in the tire width direction, thereby further improving the run-flat durability. The reinforcing cord layer 5 may be arranged at the inner part of the radial carcass 2 in the tire radius direction as shown in FIG. 3. Further, although the reinforcing cord layer 5 is arranged as one layer in the illustrated example, two or more layers may be used and the number of the layers is not particularly limited.

Such a reinforcing cord layer 5 is arranged such that the cord which constitutes the reinforcing cord layer 5 has an angle of smaller than 10° with respect to the tire radius direction, and is formed by any one selected from the group consisting of nylon 66 cord, cellulose fiber cord, PET cord and PEN cord and aramid/nylon 66 hybrid cord.

In the present invention, it is necessary to use a cord which satisfies the following physical properties as a cord which constitutes the reinforcing cord layer 5. That is, for such a cord, the elastic modulus of the cord pulled out from a tire at a temperature of 25° C. under the conditions of a load of 3N is not higher than 40 cN/dtex, and preferably not higher than 25 cN/dtex. By employing a cord having an elastic modulus at a temperature of 25° C. under the conditions of a load of 3N of not higher than 40 cN/dtex, increase in the vertical stiffness under a normal inner pressure can be restrained to maintain the ride quality.

Further, for such a cord, the thermal shrinkage stress σ(cN/dtex) at a temperature of 177° C. and the elastic modulus E(cN/dtex) at a temperature of 177° C. under the conditions of a load of 10N of the cord pulled out from a tire satisfy the following conditions: σ+0.025E≥0.36, 40≥E≥8 and σ≥0.05. By employing a cord in which the thermal shrinkage stress σ(cN/dtex) and the elastic modulus E(cN/dtex) at a temperature of 177° C. satisfy the above-mentioned conditions, since the cord exerts a stiffness when the tire is raised to a high temperature during run-flat running, the vertical strength of spring when the inner pressure of the tire is low can be increased and the durability during run-flat running can be improved. Here, the above-mentioned expression: σ+0.025E≥0.36 will be explained. As forces which support the tire during run-flat running, there exist a reaction F1 which is passively generated corresponding to the input of the external force (load and distortion) and a reaction F2 that the side portion positively generates due to a generated heat. Among these, the main dominating factor of F1 is the stiffness (elastic modulus) Ec of the reinforcing cord layer, and therefore, the F1 is represented by the following expression:

$$F1 = aEc \quad (1).$$

(In the expression, a represents the contribution ratio of the stiffness to F1, and a>0.) The main dominating factor of F2 is the thermal shrinkage stress Fh of the reinforcing cord layer, and therefore, the F2 is represented by the following expression:

$$F2 = bFh \quad (2).$$

(In the expression, b represents the contribution ratio of the thermal shrinkage stress to F2, and b>0.)

That is, in order to effectively support the run-flat running, it is necessary that the sum of the F1 and the F2 be not less than a certain level. When the level is defined as γ, the following expression is satisfied:

$$F1 + F2 \geq \gamma \quad (3).$$

(In the expression, γ represents a reference amount determined by a tire size or a load, and γ>0.)

By substituting the expressions (1) and (2) into the above-mentioned equation (3), the following expression is obtained:

$$aEc + bFh \geq \gamma.$$

By dividing the both sides of this expression and organizing the expression, the following expression is obtained:

$$Fh + a/b \times Ec \geq \gamma/b.$$

Based on the above-mentioned expression, the expression: σ+0.025E≥0.36 was obtained.

Here, the above-mentioned thermal shrinkage stress σ is suitably σ≥0.15 and more suitably 1.5≥σ≥0.15. When the thermal shrinkage stress σ is higher than 1.5 cN/dtex, the contractile force during vulcanization becomes too large, which causes cord disarrangement in the tire or rubber disarrangement to incur deterioration of the durability or deterioration of the uniformity. The thermal shrinkage stress cr of the above-mentioned cord is, from the viewpoint of sufficiently restraining the deformation of the tire during run-flat running, preferably not lower than 0.20 cN/dtex and from the viewpoint of surely restraining the deformation of the tire during run-flat running, preferably not lower than 0.30 cN/dtex, and more preferably higher than 0.4 cN/dtex.

In present invention, by arranging a reinforcing cord layer 5 employing a cord which satisfies the requirements of the above-mentioned material and physical properties, the run-flat durability can be improved while maintaining the vertical stiffness under a normal inner pressure, and both of these performances can be more highly combined. In particular, the run-flat tire of the present invention also has an excellent cost performance since a conventionally used expensive polyketone fiber is not used and a performance which is the same as or more than that of the conventional one can be secured by using a general-purpose fiber. Here, examples of a method for adjusting the physical properties of the above-mentioned cord include a method for controlling the number of twist, the tension or the temperature during dip treatment. For example, the higher the dip treatment tension, the higher the treatment tension in the final normalizing zone is, the higher the elastic modulus of the cord becomes. Note that when a treatment tension of 40 N/cord is applied, cord breakages frequently occur in the treatment, which is not preferred. When rayon or lyocell is employed, since the effect of change in the dip temperature on the elastic modulus and thermal shrinkage stress of the cord is small, there is little change in them even when the temperature is changed. When other cords are used, the higher the treatment temperature is, the higher the elastic modulus generally becomes. Note that, in order to prevent fiber breakage, it is preferred that the treatment be performed at a temperature lower than the melting temperature by 5° C. more. Further, the smaller the number of twist is, the higher the elastic modulus becomes. However, when the number of twist is too small, the fatigability and adhesiveness of the cord considerably decrease, which is not preferred. On the contrary, the number of twist is too large, the cord strength decreases and the elastic modulus of the cord also decreases, which is similarly not preferred. The preferred range of the twist coefficient of the reinforcing cord layer is at the same level as that of the normal carcass ply.

The end count of the cords constituting the reinforcing cord layer 5 is preferably 40 to 60 cords/50 mm. When the end count is either too small or too large, the effect of improving the run-flat durability may not be sufficiently obtained.

By coating a cord which satisfies the requirements of the above-mentioned material and physical properties with a coating rubber at a prescribed end count, a cord/rubber complex used for the reinforcing cord layer 5 can be obtained. The coating rubber which is used here is not particularly limited, and a coating rubber which is conventionally used for a cord/rubber complex for tires can be used. Prior to the covering of the cord with the coating rubber, an adhesive treatment may be applied to the cord to improve the adhesiveness to the coating rubber.

The run-flat tire of the present invention can be manufactured by a conventional method by arranging the above-mentioned reinforcing cord layer 5 such that the layer adjoins at least from the belt end to the maximum width portion of the tire side portion. In the run-flat tire of the present invention, as a gas which fills the tire, a normal air or an air whose oxygen partial pressure is varied, or an inactive gas such as nitrogen can be used.

EXAMPLES

The present invention will now be described in detail by way of Examples.

Fiber cords satisfying the conditions of reinforcing cord layers represented by the Tables 1 to 4 below were arranged in parallel at an end count shown in the Tables and coated with a coating rubber to manufacture cord/rubber complexes. The obtained cord/rubber complex was used for a reinforcing cord layer 5 to manufacture a side reinforcing type run-flat tire according to each Example having a structure represented by FIG. 1 or FIG. 2. The tire size 245/45R19 was used. The angle of the cord constituting reinforcing cord layer 5 with respect to the tire radius direction is as shown in the Tables. In the Tables below, all of the elastic modulus of the cord constituting the reinforcing cord layer at a temperature of 25° C. under the conditions of a load of 3N, the thermal shrinkage stress σ of the cord constituting the reinforcing cord layer at a temperature of 177° C. and the elastic modulus E of the cord constituting the reinforcing cord layer at a temperature of 177° C. under the conditions of a load of 10N are values measured for the cord pulled out from a tire.

A run-flat tire of Comparative Example 1 was manufactured in the same structure as in the Example except that the reinforcing cord layer 5 was not provided. Further, run-flat tires of Comparative Examples 2 to 5 were manufactured by changing the cord conditions of the reinforcing cord layer 5 as shown in the Tables below.

For each of the obtained test tires, the run-flat durability and the vertical strength of spring when inflated to an inner pressure were evaluated according to the following. The results are shown in the Tables 1 to 4 below together with a total performance represented by the difference between the run-flat durability index and the vertical stiffness index.

(1) Run-flat Durability

Without being inflated to an inner pressure, each test tire was subjected to a drum test under a load of 4.17 kN, a speed of 89 km/h and a temperature of 38° C. until resulting in a failure of the tire to measure the travel distance, and the travel distance until resulting in a failure of the tire of Comparative Example 1 was indicated as an index setting the travel distance to 100. Larger the value of the index is, the longer the travel distance until resulting in a failure of the tire becomes. The larger index means that the tire has an excellent run-flat durability.

(2) Vertical Stiffness when Inflated to an Inner Pressure

The load-deformation curve was measured for a test tire which is inflated to an inner pressure of 230 kPa and the slope of the tangent at a certain load on the obtained load-deformation curve was defined as a vertical stiffness constant with respect to the load, and the constant was indicated as an index setting the value of the vertical stiffness constant of the tire of Comparative Example 1 to 100. The smaller the value of the index is, the smaller the vertical stiffness constant is. The smaller index means that the tire has an excellent ride quality during normal running.

TABLE 1

| | | Comparative Example 1 | Example 1 | Example 2 | Example 3 | Example 4 |
|---|---|---|---|---|---|---|
| Carcass ply | Number of layer | 1 | 1 | 1 | 1 | 1 |
| | Cord material | Rayon | Rayon | Rayon | Rayon | Rayon |
| | Cord construction (dtex/cord) | 1840/2 | 1840/2 | 1840/2 | 1840/2 | 1840/2 |
| Reinforcing cord layer | Presence or absence | Absent | Present | Present | Present | Present |
| | Insert position | — | FIG. 1 | FIG. 2 | FIG. 2 | FIG. 2 |
| | Cord angle (°) | — | 0 | 0 | 0 | 0 |
| | Cord material | — | Rayon | Rayon | Rayon | Rayon |
| | Cord construction (dtex/cord) | — | 1840/2 | 1840/2 | 1840/2 | 1840/2 |
| | End count (cords/50 mm) | — | 50 | 50 | 50 | 50 |
| | Elastic modulus at a temperature of 25° C. under the conditions of a load of 3N (cN/dtex) | — | 20 | 20 | 40 | 10 |
| | Elastic modulus E at a temperature of 177° C. under the conditions of a load of 10N (cN/dtex) | — | 19 | 19 | 38 | 8 |
| | Thermal shrinkage stress σ at a temperature of 177° C. (cN/dtex) | — | 0.11 | 0.11 | 0.07 | 0.22 |
| | σ + 0.025E | — | 0.585 | 0.585 | 1.02 | 0.42 |
| Tire performance | Run-flat durability index (A) (%) | 100 | 117 | 126 | 125 | 125 |
| | Vertical stiffness index (B) when inflated to an inner pressure (%) | 100 | 101 | 101 | 102 | 100 |
| | Total performance (A − B) | 0 | 16 | 25 | 23 | 25 |

TABLE 2

| | | Example 5 | Example 6 | Example 7 | Example 8 | Example 9 |
|---|---|---|---|---|---|---|
| Carcass ply | Number of layer | 1 | 1 | 1 | 1 | 1 |
| | Cord material | Rayon | Rayon | Rayon | PEN | Rayon |
| | Cord construction (dtex/cord) | 1840/2 | 1840/2 | 1840/2 | 1670/2 | 1840/2 |

TABLE 2-continued

|  |  | Example 5 | Example 6 | Example 7 | Example 8 | Example 9 |
|---|---|---|---|---|---|---|
| Reinforcing cord layer | Presence or absence | Present | Present | Present | Present | Present |
|  | Insert position | FIG. 2 | FIG. 2 | FIG. 2 | FIG. 2 | FIG. 2 |
|  | Cord angle (°) | 0 | 0 | 0 | 0 | 0 |
|  | Cord material | Nylon 66 | Nylon 66 | Nylon66 | Rayon | Rayon |
|  | Cord construction (dtex/cord) | 1400/2 | 1400/2 | 1400/2 | 1840/2 | 1840/3 |
|  | End count (cords/50 mm) | 50 | 50 | 50 | 50 | 40 |
|  | Elastic modulus at a temperature of 25° C. under the conditions of a load of 3N (cN/dtex) | 15 | 15 | 28 | 20 | 17 |
|  | Elastic modulus E at a temperature of 177° C. under the conditions of a load of 10N (cN/dtex) | 8 | 8 | 16 | 19 | 15 |
|  | Thermal shrinkage stress σ at a temperature of 177° C. (cN/dtex) | 0.21 | 0.35 | 0.21 | 0.11 | 0.08 |
|  | σ + 0.025E | 0.41 | 0.55 | 0.61 | 0.585 | 0.455 |
| Tire performance | Run-flat durability index (A) (%) | 112 | 119 | 114 | 110 | 128 |
|  | Vertical stiffness index (B) when inflated to an inner pressure(%) | 100 | 100 | 101 | 101 | 100 |
|  | Total performance (A − B) | 12 | 19 | 13 | 9 | 28 |

TABLE 3

|  |  | Example 10 | Example 11 | Example 12 | Example 13 |
|---|---|---|---|---|---|
| Carcass ply | Number of layer | 1 | 1 | 1 | 1 |
|  | Cord material | Rayon | Rayon | Rayon | Rayon |
|  | Cord construction (dtex/cord) | 1840/2 | 1840/2 | 1840/2 | 1840/2 |
| Reinforcing cord layer | Presence or absence | Present | Present | Present | Present |
|  | Insert position | FIG. 2 | FIG. 2 | FIG. 2 | FIG. 2 |
|  | Cord angle (°) | 0 | 0 | 0 | 0 |
|  | Cord material | PEN | PET | Lyocell | Aramid/Nylon 66 hybrid |
|  | Cord construction (dtex/cord) | 1670/2 | 1670/2 | 1840/2 | (Aramid: 1670 × 2 + Nylon 66: 940 × 1)/3 |
|  | End count (cords/50 mm) | 50 | 50 | 50 | 50 |
|  | Elastic modulus at a temperature of 25° C. under the conditions of a load of 3N (cN/dtex) | 19 | 18 | 25 | 17 |
|  | Elastic modulus E at a temperature of 177° C. under the conditions of a load of 10N (cN/dtex) | 12 | 11 | 23 | 29 |
|  | Thermal shrinkage stress σ at a temperature of 177° C. (cN/dtex) | 0.15 | 0.15 | 0.05 | 0.18 |
|  | σ + 0.025E | 0.45 | 0.425 | 0.625 | 0.905 |
| Tire performance | Run-flat durability index (A) (%) | 110 | 108 | 121 | 121 |
|  | Vertical stiffness index (B) when inflated to an inner pressure (%) | 101 | 101 | 101 | 101 |
|  | Total performance (A − B) | 9 | 7 | 20 | 20 |

TABLE 4

|  |  | Comparative Example 2 | Comparative Example 3 | Comparative Example 4 | Comparative Example 5 |
|---|---|---|---|---|---|
| Carcass ply | Number of layer | 1 | 1 | 1 | 1 |
|  | Cord material | Rayon | Rayon | Rayon | Rayon |
|  | Cord construction (dtex/cord) | 1840/2 | 1840/2 | 1840/2 | 1840/2 |
| Reinforcing cord layer | Presence or absence | Present | Present | Present | Present |
|  | Insert position | FIG. 2 | FIG. 2 | FIG. 2 | FIG. 2 |
|  | Cord angle (°) | 10 | 0 | 0 | 0 |
|  | Cord material | Rayon | Nylon 66 | Nylon 6 | Aramid |
|  | Cord construction (dtex/cord) | 1840/2 | 1400/2 | 1400/2 | 1670/2 |
|  | End count (cords/50 mm) | 50 | 50 | 50 | 40 |
|  | Elastic modulus at a temperature of 25° C. under the conditions of a load of 3N (cN/dtex) | 20 | 15 | 15 | 50 |
|  | Elastic modulus E at a temperature of 177° C. under the conditions of a load of 10N (cN/dtex) | 19 | 8 | 7 | 48 |
|  | Thermal shrinkage stress σ at a temperature of 177° C. (cN/dtex) | 0.11 | 0.12 | 0.15 | 0.01 |
|  | σ + 0.025E | 0.585 | 0.32 | 0.325 | 1.21 |
| Tire performance | Run-flat durability index (A) (%) | 110 | 100 | 100 | 105 |
|  | Vertical stiffness index (B) when inflated to an inner pressure (%) | 110 | 100 | 100 | 105 |
|  | Total performance (A − B) | 0 | 0 | 0 | 0 |

Here, the physical properties of the cords represented in the Tables 1 to 4 were adjusted by controlling the dipping conditions (tension and temperature) and the number of twist. For example, the control conditions for cases in which the cord material is nylon 66 (1400/2) are shown in the Table below (corresponding to Examples 5 to 7).

TABLE 5

|  | Number of twist (cord/10 cm) | Dip treatment tension in the normalizing zone (N/cord) | Dip treatment temperature in hot zone (° C.) | Elastic modulus E at a temperature of 177° C. under the conditions of a load of 10N (cN/dtex) | Thermal shrinkage stress σ at a temperature of 177° C. (cN/dtex) |
|---|---|---|---|---|---|
| Comparative Example 3 | 30 × 30 | 10 | 230 | 8 | 0.12 |
| Example 5 | 40 × 40 | 16 | 230 | 8 | 0.21 |
| Example 6 | 50 × 50 | 22 | 230 | 8 | 0.35 |
| Example 7 | 30 × 30 | 16 | 230 | 16 | 0.21 |

As shown in the above Table 5, in Example 5, by increasing the dip treatment tension in the normalizing zone and increasing the number of twist, the thermal shrinkage stress increased. In Example 6, by considerably increasing the dip treatment tension in the normalizing zone and considerably increasing the number of twist, the thermal shrinkage stress considerably increased. In Example 7, by not changing the number of twist and increasing the dip treatment tension in the normalizing zone, the elastic modulus increased and the thermal shrinkage stress increased.

From the results in the above Tables 1 to 4, it is found that in the test tire in each Example in which the conditions of the present invention are satisfied, the run-flat performance improved while maintaining the vertical stiffness index, and an effect of improving the total performance was obtained.

On the other hand, in Comparative Example 2 in which the cord angle of the reinforcing cord layer is 10°, the vertical stiffness when inflated to an inner pressure increased and the ride quality was compromised.

In Comparative Examples 3 and 4 in which the elastic modulus and the thermal shrinkage stress are low and σ+0.025E<0.36, since a sufficient elastic modulus and a thermal shrinkage stress during run-flat running are not generated, the deformation of the side reinforcing rubber layer could not be sufficiently controlled and the run-flat durability could not be improved. Further, in Comparative Example 5 in which the elastic modulus is considerably high and the thermal shrinkage stress is extremely low, even when the elastic modulus during run-flat running (in a high temperature) is high, since the thermal shrinkage stress (contractile force) of fiber is extremely small, the deformation of the side reinforcing rubber layer could not be sufficiently controlled and the run-flat durability could not be improved.

| | Description of Symbols |
|---|---|
| 1 | bead core |
| 2 | radial carcass |
| 3 | belt |
| 4 | side reinforcing rubber layer |
| 5 | reinforcing cord layer |
| 6 | bead filler |
| 7A, 7B | belt reinforcing layer |
| 8 | rim guard |
| 11 | bead portion |
| 12 | tread portion |
| 13 | buttress portion |
| 14 | side portion |

The invention claimed is:

1. A run-flat tire comprising a radial carcass composed of one or more carcass plies extending toroidally between bead cores embedded in a pair of bead portions, at least one layer of belt arranged at the outer part of the radial carcass in the tire radius direction, and provided with a tread portion arranged at an outer part of a crown portion of the radial carcass in the tire radius direction, a pair of buttress portions positioned at both ends of the tread portion and a pair of side portions connecting the buttress portion and the bead portion, wherein a pair of crescent cross-sectional side reinforcing rubber layers are arranged at the inner part of the radial carcass extending from the buttress portion to the side portion, characterized in that the tire is provided with a reinforcing cord layer adjoining the radial carcass at least from the belt end to the maximum width portion of the tire side portion;

cords constituting the reinforcing cord layer are selected from the group consisting of nylon 66 cord, cellulosic fiber cord, polyethylene terephthalate cord, polyethylene naphthalate cord and aramid/nylon 66 hybrid cord, and has a cord angle of less than 10° with respect to the tire radius direction; and the elastic modulus of the cord pulled out from the tire at a temperature of 25° C. under the conditions of a load of 3 N is not higher than 40 cN/dtex, and the thermal shrinkage stress $\sigma$ (cN/dtex) at a temperature of 177° C. and the elastic modulus E (cN/dtex) at a temperature of 177° C. under the conditions of a load of 10 N satisfy the following conditions: $\sigma+0.025E \geq 0.36$, $40 \geq E \geq 8$, and $\sigma \geq 0.05$.

2. The run-flat tire according to claim 1, wherein the thermal shrinkage stress $\sigma$ (cN/dtex) at a temperature of 177° C. and the elastic modulus E (cN/dtex) at a Temperature of 177° C. under the conditions of a load of 10N of the cord pulled out from a tire satisfy the following conditions: $\sigma+0.025E \geq 0.36$, $40 \geq E \geq 8$ and $\sigma \geq 0.15$.

3. The run-flat tire according to claim 1, wherein the end count of the cords constituting the reinforcing cord layer is 40 to 60 per 50 mm.

4. The run-flat tire according to claim 1, wherein the cord constituting the carcass ply is selected from the group consisting of cellulose fiber cord, polyethylene terephthalate cord and polyethylene naphthalate cord.

5. The run-flat tire according to claim 1, wherein the reinforcing cord layer extends to the bead core and has a rolled-up portion which is rolled up around the bead core from the inner part to the outer part in the tire width direction.

* * * * *